US011347331B2

(12) United States Patent
Files et al.

(10) Patent No.: US 11,347,331 B2
(45) Date of Patent: May 31, 2022

(54) PORTABLE INFORMATION HANDLING SYSTEM STYLUS GARAGE AND CHARGE INTERFACE

(71) Applicant: Dell Products L.P., Round Rock, TX (US)

(72) Inventors: Jace W. Files, Round Rock, TX (US); John T. Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/377,781

(22) Filed: Apr. 8, 2019

(65) Prior Publication Data
US 2020/0319719 A1 Oct. 8, 2020

(51) Int. Cl.
G06F 3/038 (2013.01)
G06F 1/26 (2006.01)
G08B 21/24 (2006.01)
G06F 3/0354 (2013.01)
G06F 1/16 (2006.01)

(52) U.S. Cl.
CPC ............ G06F 3/038 (2013.01); G06F 1/1613 (2013.01); G06F 1/26 (2013.01); G06F 3/03545 (2013.01); G08B 21/24 (2013.01)

(58) Field of Classification Search
None
See application file for complete search history.

(56) References Cited

U.S. PATENT DOCUMENTS

| | | |
|---|---|---|
| 5,396,351 A | 3/1995 | Gessel |
| 5,553,296 A | 9/1996 | Forrest et al. |
| 5,699,444 A | 12/1997 | Palm |
| 5,825,436 A | 10/1998 | Knight |
| 5,894,298 A | 4/1999 | Hoeksma |
| 6,322,729 B2 | 11/2001 | Chan et al. |
| 6,646,626 B1 | 11/2003 | Uskali et al. |
| 7,301,532 B1 | 11/2007 | Dobry |
| 7,430,003 B2 | 9/2008 | Nichols et al. |
| 7,502,010 B2 | 3/2009 | Kirk |
| 7,843,429 B2 | 11/2010 | Pryor |
| 8,707,174 B2 | 4/2014 | Hinckley et al. |
| 9,395,762 B2 | 7/2016 | Sharma et al. |
| 9,524,139 B2 | 12/2016 | Aurongzeb et al. |

(Continued)

FOREIGN PATENT DOCUMENTS

WO   WO2018056998   *   3/2018   ......... G06F 3/03545

OTHER PUBLICATIONS

U.S. Appl. No. 16/107,748, entitled "Context Aware Secondary Screen UI on Dual Screen Productivity 2-in-1 Devices", filed Aug. 21, 2018, by Viswanathan et al.

*Primary Examiner* — Ifedayo B Iluyomade
(74) *Attorney, Agent, or Firm* — Zagorin Cave LLP; Robert W. Holland

(57) ABSTRACT

An active stylus couples to an information handling system by a removable clip that inserts into a slot formed in the information handling system housing. Power to charge a battery of the active stylus passes from an interface internal to the information handling system, through the clip and to a charger in the active stylus. The active stylus clip releases the active stylus in the presence of excessive force to prevent damage to the information handling system and active stylus.

19 Claims, 5 Drawing Sheets

(56) References Cited

U.S. PATENT DOCUMENTS

| | | | |
|---|---|---|---|
| 9,946,373 B2 | 4/2018 | Graf et al. | |
| 10,204,592 B1 | 2/2019 | Trim et al. | |
| 2006/0132447 A1 | 6/2006 | Conrad | |
| 2011/0209039 A1 | 8/2011 | Hinckley et al. | |
| 2012/0066591 A1 | 3/2012 | Hackwell | |
| 2014/0029183 A1 | 1/2014 | Ashcraft et al. | |
| 2014/0078116 A1* | 3/2014 | Mercea | G06F 3/03545 345/179 |
| 2014/0253468 A1* | 9/2014 | Havilio | G06F 3/03545 345/173 |
| 2017/0075640 A1* | 3/2017 | Chun | G06F 1/1683 |
| 2019/0163432 A1 | 5/2019 | Files et al. | |
| 2019/0278323 A1 | 9/2019 | Aurongzeb et al. | |
| 2021/0141469 A1* | 5/2021 | Jabori | G06F 3/03545 |

* cited by examiner

PORTABLE INFORMATION HANDLING SYSTEM STYLUS GARAGE AND CHARGE INTERFACE

BACKGROUND OF THE INVENTION

Field of the Invention

The present invention relates in general to the field of portable information handling system interface devices, and more particularly to a portable information handling system stylus garage and charge interface.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems typically integrate a touchscreen display to accept end user inputs as touches that represent values presented through a user interface. For example, a touchscreen display presents a keyboard and accepts touches at keys of the keyboard that are assigned input values based upon the presented key values. In some portable information handling systems, an end user draws inputs at a touchscreen, such as by writing words or tracing images. Generally, an application executing on the information handling system applies the inputs, such as by assigning values based on letter and number recognition or by saving a drawn image in an image file format. In a typical portable information handling system, images created by a finger trace at a touchscreen tend to lack precision since finger width at the touchscreen typically exceeds touchscreen detection resolution.

One way to increase the precision of touch inputs is to apply touches through an active stylus. For instance, a stylus has the shape of a pen with a small tip that touches at the touchscreen with greater precision than a fingertip. In addition to having a smaller contact location for better touch precision, a stylus may include an active tip that increases capacitance touch detection to even better distinguish touch location. An end user grasps a stylus like a pen and uses the tip to make precision touch inputs that have greater accuracy. In particular, drawings made by an active stylus can have accuracy as precise as the touchscreen detection resolution will allow.

A number of difficulties tend to arise with the use of an active stylus at a portable information handling system. One difficulty is storing the active stylus in a secure manner at the portable information handling system when not in use. Some portable information handling systems have external garages that hold the stylus, such as a loop of material extending out of a cover that protects the information handling system. Portable information handling systems that lack a protective cover can instead couple a stylus to the housing with magnetic attraction. Locating a stylus outside the housing risks breaking of the stylus or the garage if an external force is applied that separates them. A breakaway stylus garage, such as is provided by a magnet, can result in loss of the stylus. In either arrangement, charging of the stylus battery when garaged is difficult, generally requiring some external routing of a power interface. An alternative approach is to garage the stylus internally, such as within an opening formed in the housing. This approach tends to restrict the size of the stylus, making it less user-friendly for writing and leaving less room within the stylus for a battery and processing resources, such as Bluetooth communication components.

SUMMARY OF THE INVENTION

Therefore, a need has arisen for a system and method which couples a stylus to a portable information handling system in a robust manner.

In accordance with the present invention, a system and method are provided which substantially reduce the disadvantages and problems associated with previous methods and systems for coupling a stylus to a portable information handling system. A clip removably couples to a stylus and inserts into a slot formed in an information handling system housing so that the clip couples the stylus to the information handling system as an intermediary. In the event of application of an excess force at the stylus, the stylus separates from the clip to prevent damage to the information handling system housing.

More specifically, a portable information handling system integrates processing components in a portable housing to process information for presentation as visual images at a touchscreen display. An active stylus couples to the information handling system housing with a clip that inserts into a slot formed in the housing and removably coupled to the stylus. The active stylus is powered with a battery that integrates in an interior of the stylus and is charged by a charger that accepts power from an external information handling system. Power transfers from the information handling system interior in the slot, through the clip and then into the interior of the stylus, such as through a ring formed at an interior surface of the clip at the coupling location to the stylus. In one embodiment, removal of the stylus from the information handling system while the clip remains in the slot results in an audible alarm sounding at the information handling system and stylus. The information handling system initiates the alarm if a Hall sensor fails to detect a magnet of the stylus within a predetermined distance while also detecting the clip interface with the charger. The stylus initiates an alarm if the stylus separates from the clip while the clip remains coupled to the housing.

The present invention provides a number of important technical advantages. One example of an important technical advantage is that a stylus couples to a portable information handling system by inserting a clip into a small opening formed in the information handling system housing. Excess pressure on the clip results in separation of the stylus from the clip without damage to the housing. The clip interfaces a power source of the information handling system with a charger of the stylus to charge the stylus battery. For instance, the clip couples to the stylus at a contact ring that communicates charge and data to contact pins of the stylus. In one embodiment, unexpected separation of the stylus from the information handling system triggers an alarm to alert an end user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A stylus couples to an information handling system housing with a clip that inserts into a slot formed in the housing. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
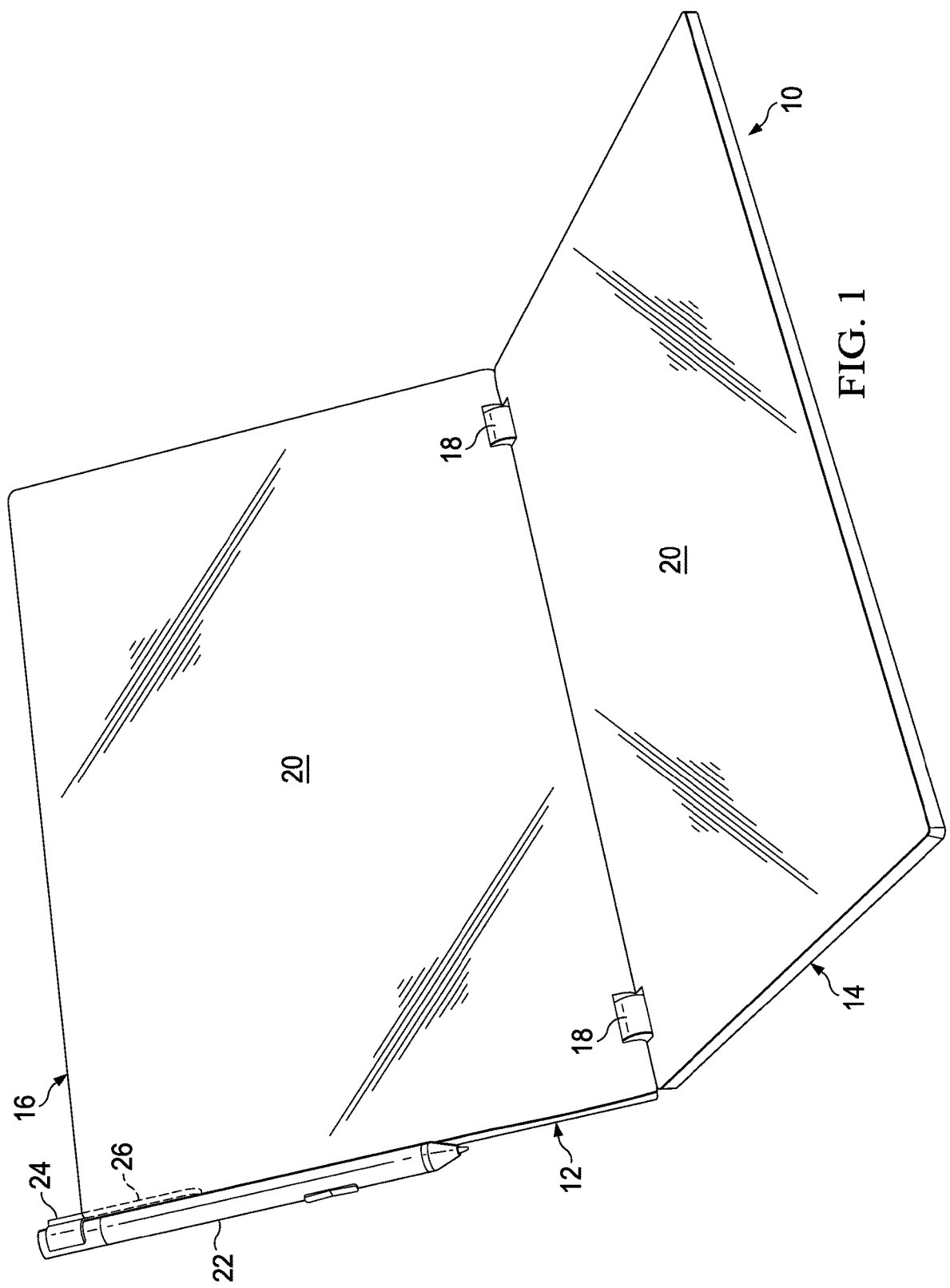
FIG. 1 depicts a front perspective view of a portable information handling system having a stylus coupled with a clip inserted at a slot.

Referring now to FIG. 1, a front perspective view depicts a portable information handling system 10 having a stylus 22 coupled with a clip 24 inserted at a slot 26. In the example embodiment, information handling system 10 has a portable form factor built into a portable housing 12 having a base housing portion 14 and lid housing portion 16 rotationally coupled to each other by hinges 18. Each of housing portions 14 and 16 support a touchscreen display 20 that presents information as visual images and accepts touches as inputs. In alternative embodiments, information handling system 10 may have alternative form factors, such as table form factor or a convertible form factor that includes a keyboard integrated in base housing portion 14.

In the example embodiment, a stylus 22 removably couples to portable information handling system 10 with a clip 24. Stylus 22 provides a writing implement in the form of a pen that an end user grasps to make inputs at a touchscreen of display 20. Clip 24 removably couples to stylus 22 and inserts in a slot 26 formed in lid housing portion 16 to offer a garage for storing stylus 22 when not in use. In the event that an excessive force is applied against stylus 22 while garaged by insertion of clip 24 into slot 26, clip 24 releases from stylus 22 to avoid damage caused by excessive translation of force to housing 12. For instance, stylus 22 releases from clip 24 while clip 24 remains inserted in slot 26. In one example embodiment, clip 24 or housing 12 may include a structure designed to break away in the event that excessive force is applied against clip 24 itself, such as after stylus 22 is released. The goal of clip 24 as an intermediary that couples stylus 22 to information handling system 10 is to minimize damage to information handling system 10 should excessive force be applied to stylus 22 while garaged.

Figure 2:
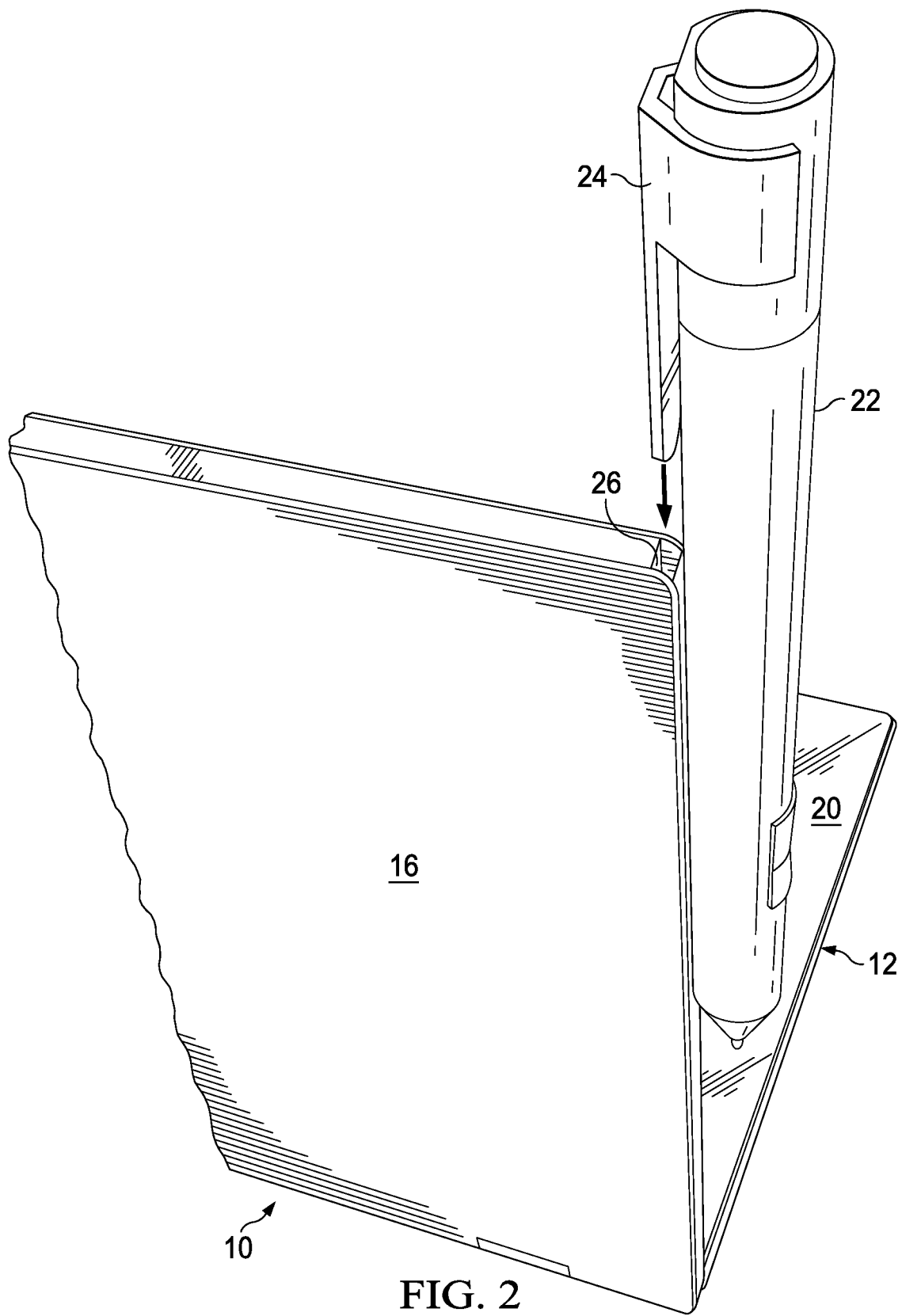
FIG. 2 depicts a rear perspective view of the portable information handling system having the stylus de-coupled by removal of the clip from the slot.

Referring now to FIG. 2, a rear perspective view depicts portable information handling system 10 having stylus 22 de-coupled by removal of the clip 24 from the slot 26. In the example embodiment, slot 26 has a size that securely accepts clip 24 and an alignment that holds stylus 22 against the side of housing 12 when clip 24 inserts. To remove stylus 22 for use, an end user pulls upward on stylus 22 to pull clip 24 out of slot 26 and then writes with stylus 22 against display 20. Once an end user completes handwritten inputs, stylus 22 couples to housing 12 by inserting clip 24 back into slot 26. In one example embodiment, stylus 22 is further stabilized in a desired position by aligning a magnet and ferromagnetic material between housing 12 and stylus 22 that reduces motion of stylus 22 relative to housing 12 distal the insertion point of clip 24 in slot 26.

Figure 3:
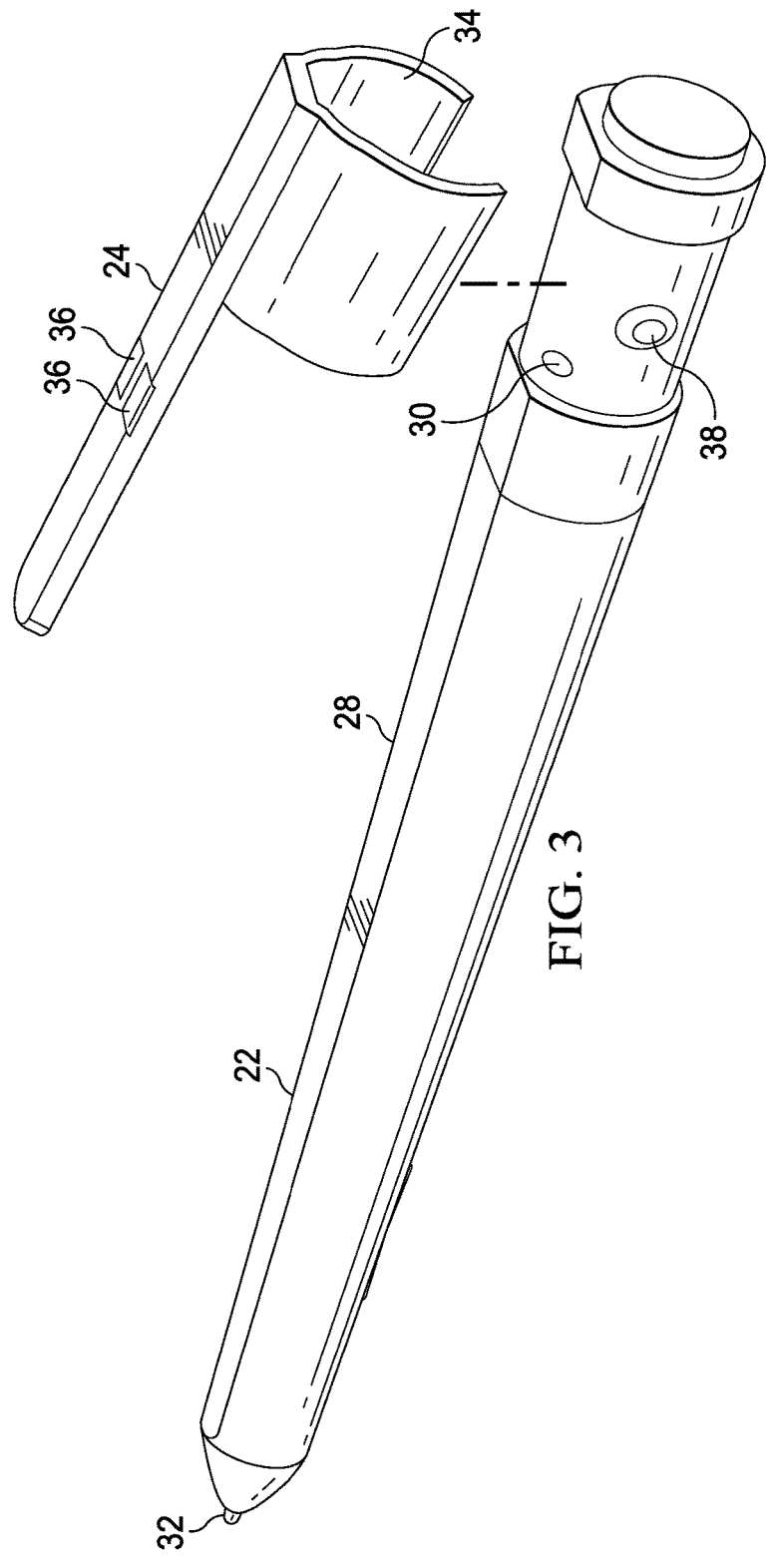
FIG. 3 depicts a side perspective view of the stylus having the clip de-coupled from an aligning structure formed in a body of the stylus.

Referring now to FIG. 3, a side perspective view depicts stylus 22 having clip 24 de-coupled from an aligning structure 30 formed in a body 28 of stylus 22. In the example embodiment, stylus 22 includes an active capacitive tip 32 terminating at an end of body 28 opposite alignment structure 30. Active capacitive tip 32 outputs an increased capacitive value when applied against a touch surface, such as a touchscreen display 20 that detects touch inputs by measuring capacitance. Clip 24 is depicted exploded away from body 28 to illustrate a coupling element 34 that fits into alignment structure 30 and snaps in place to secure clip 24 to body 28. In one example embodiment, alignment structure 30 and clip 24 include cooperating shapes that align clip 24 to a predetermined rotational orientation relative to body 28, such as an indentation corresponding to a slot or a non-circular form. In an alternative embodiment, alignment structure 30 has a circular shape that allows clip 24 to rotate relative to body 28.

In order to increase capacitance at active capacitive tip 32, a battery integrated in the interior of body 28 provides power to active capacitive tip 32. To provide a charge to the battery, clip 24 integrates a conductive traces that transfers power from information handling system 10 when stylus 22 garages at housing 12 through clip 24. In the example embodiment, a charging interface 36 is exposed at the outer surface of clip 24 to contact a charging terminal disposed within information handling system 10. Conductive traces run from charging interface 36 through clip 24 and to an inner surface of coupling element 34 to provide an electrical interface with power contact 38 that extends out from alignment structure 30, such as with a spring loaded pogo pin. In the example embodiment, charging interface 36 includes two conductive pads, such as for power and ground. In alternative embodiments, ground may be provided by contact with the outer surface of clip 24 against a grounded surface of information handling system 10. In one alternative embodiment, a second conductive trace may support a dedicated communication interface, such as an I2C interface, or communications may be supported through the power tracing, such as by sharing the trace between a processor and charger.

Figure 4:
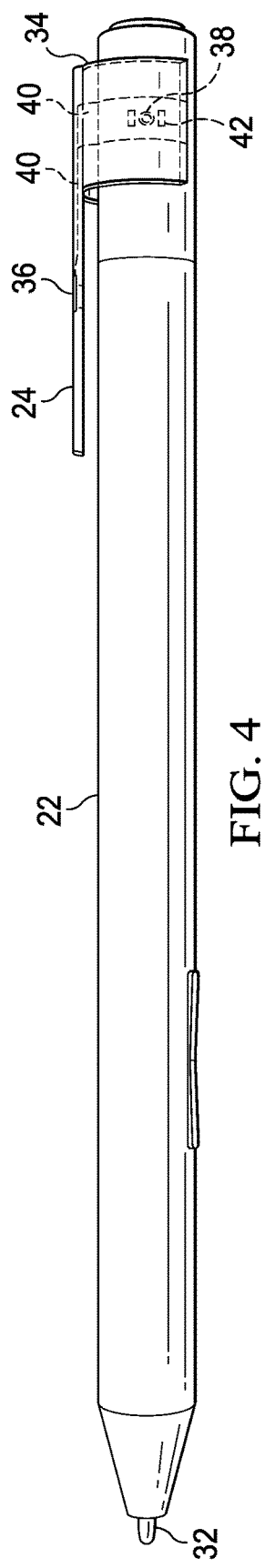
FIG. 4 depicts a side cutaway view of the stylus having a conductive ring integrated in the clip that transfers power provided from the information handling system.

Referring now to FIG. 4, a side cutaway view depicts stylus 22 having a conductive ring 42 integrated in clip 24 that transfers power provided from information handling system 10. A conductive wire 40 integrates in clip 24 to communicate power and signals from the outer surface of clip 24 to inner conductive ring 42 exposed on the inner surface of coupling element 34. Inner conductive ring 42 supports power transfer at plural rotational orientations of clip 24 relative to body 28 of stylus 22 so that an internal battery will charge through power contact 38 even if its alignment changes relative to clip 24.

Figure 5:
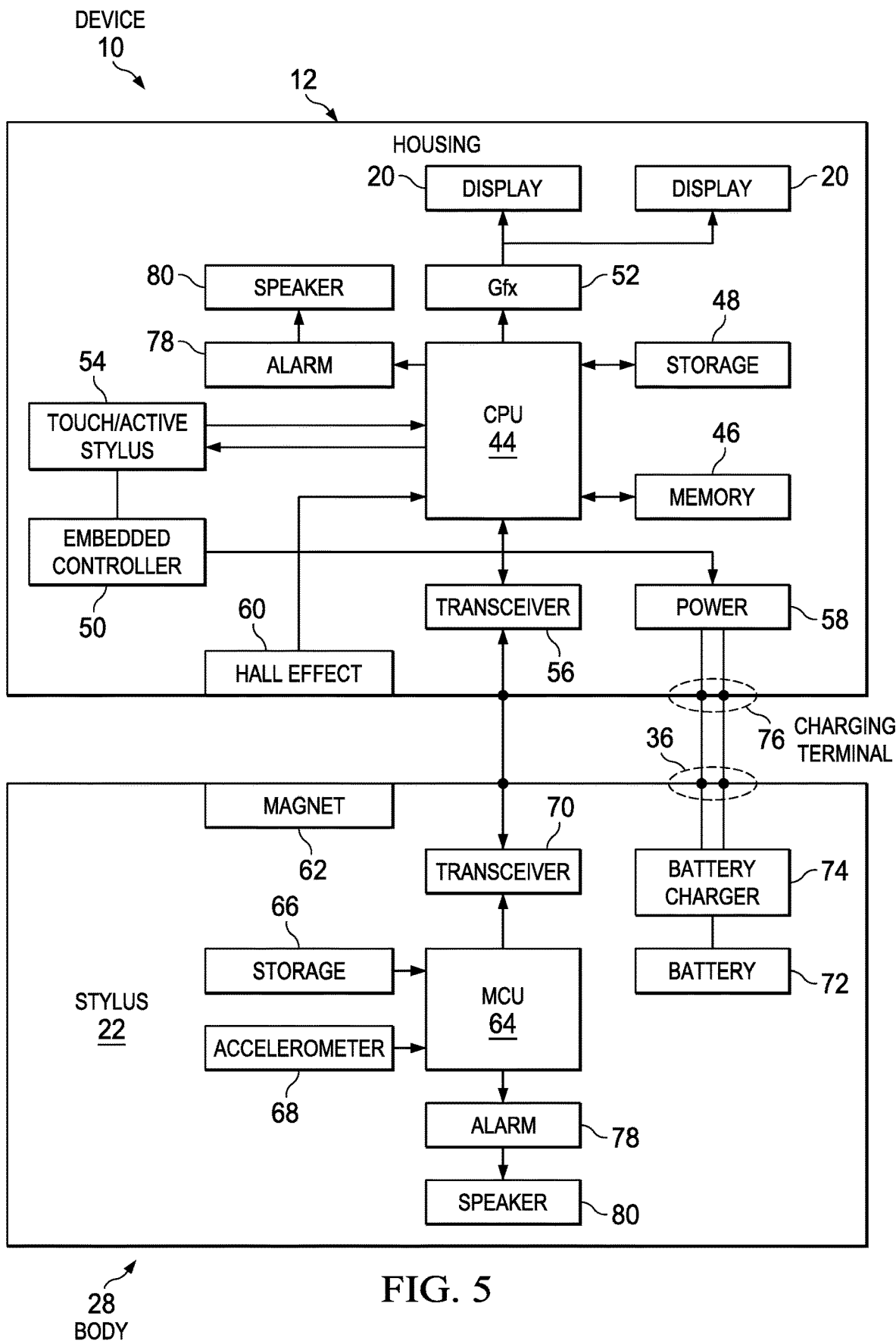
FIG. 5 depicts a block diagram of the information handling system and stylus.

Referring now to FIG. 5, a block diagram depicts information handling system 10 and stylus 22. Information handling system 10 processes information with components disposed within a housing 12. A central processing unit (CPU) 44 executes instructions of an operating system and applications stored in memory 46, such as random access memory (RAM), and retrieved from persistent storage 48, such as a solid state drive (SSD). An embedded controller 50, such as a keyboard controller, executes firmware stored in non-transitory flash memory to manage operations at information handling system 10, such as power management and interactions with input/output (I/O) and peripheral devices. In the example embodiment, a graphics controller 52 generates pixel values to present visual images at displays 20. A touch detection controller 54 detects touches at displays 20 and reports the touches as inputs to CPU 44, such as touches by stylus 22. A transceiver 56, such as Bluetooth and or WiFi wireless network interface card (WNIC) establishes data communications with stylus 22. A power subsystem 58 interfaced with embedded controller 50 manages application of power to the processing components within information handling system 10.

Stylus 22 docks next to housing 12 with a magnet 62 that aligns to a Hall sensor 60 so that presence of stylus 22 in a docked position is confirmed. A microprocessor unit (MCU) 64 in stylus 22 executes applications that manage active capacitance output from stylus 22, such as by executing an application stored in storage 66. An accelerometer 68 interfaces with MCU 64 to detect accelerations. A transceiver 70, such as Bluetooth or WiFi wireless network interface card (WNIC) 70 supports wireless communications with information handling system 10. A battery 72 powers the components of stylus 22 and is charged by a battery charger 74 that accepts charge sent by a charging terminal 76 to a charging interface 36 of stylus 22. For instance, charging terminal 76 is disposed within a slot of housing 12 to send power to charging interface 36 disposed in a clip 24, which in turn communicates power to power contact 38. In one alternative embodiment, charging terminal 76 and charging interface 36 may also support data communication between CPU 44 and MCU 64. Detection of magnet 62 by Hall effect sensor 60 initiates charging of battery 72.

In the example embodiment, information handling system 10 and stylus 22 each include an alarm 78 and speaker 80 to issue an alarm notification in the event stylus 22 inadvertently releases from housing 12. For instance, alarm 78 is logic stored in firmware and executed on a processor or controller that commands an audible noise from speaker 80 if clip 24 remains inserted in slot 26 with stylus 22 separated from clip 24. A variety of sensed conditions may be used to detect the alarm condition and issue the alarm. For instance, impedance, current or resistance measured at charging terminal 76 and/or power contact 38 may be set to provide different values if stylus 22 is coupled to clip 24 versus separate from clip 24. Such values may, for example, be set with ground resistors of different values at information handling system 10, stylus 22 and within the conductive trace of clip 24. As another example, presence versus absence of clip 24 in slot 26 may be detected by ground detection while presence versus absence of stylus 22 is detected by Hall sensor 60 proximity to magnet 62. For instance, if clip 24 is detected by an electrical interface while magnet 62 is not detected, an alarm sounds indicating separation stylus 22 from clip 24. By issuing an alarm from either or both of information handling system 10 and stylus 22, the location of stylus 22 may be determined with the alarm sound before the stylus has fallen too far away to be readily located. Within stylus 22, issuance of the alarm may depend upon a detected order of changes in interfaces. For example, if clip 24 is interfaced with information handling system 10 when a separation is detected between stylus 22 and clip 24, then an alarm may sound. In contrast, if clip 24 is separate from information handling system 10, then removal of clip 24 from stylus 22 may not result in issuance of the alarm.

Figure 6:
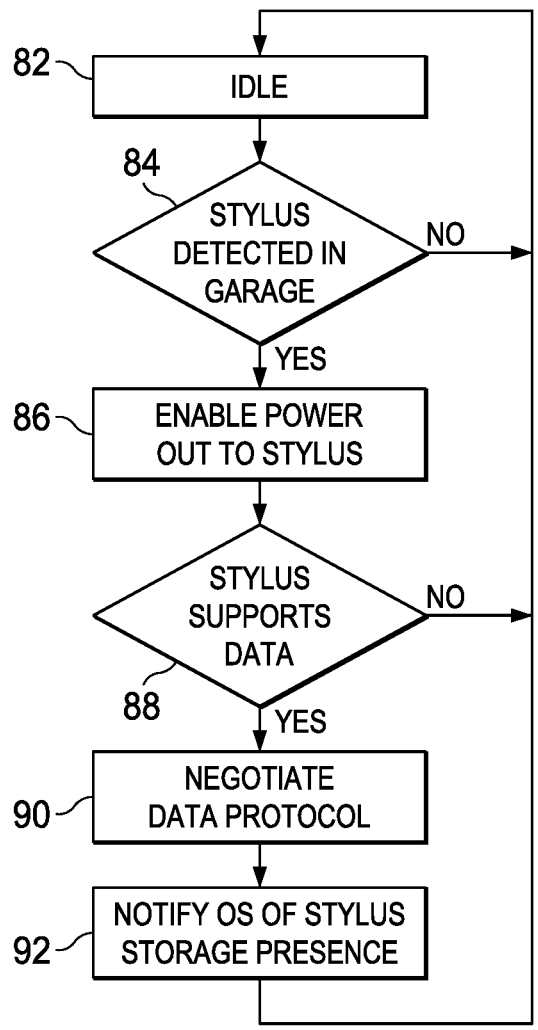
FIG. 6 depicts a flow diagram of a process for coordinating charging of the stylus from the information handling system.

Referring now to FIG. 6, a flow diagram depicts a process for coordinating charging of stylus 22 from the information handling system 10. The process starts at step 82 from an idle state and continues to step 84 to determine if a stylus is stored in the garage slot of information handling system 10. If not, the process returns to step 82. If so, the process continues to step 86 to enable power transfer to the stylus. In the example embodiment, presence is detected by a Hall sensor that detects a magnet in the stylus or by electrical conditions as charging terminal 76. Once power transfer has started, the process continues to step 88 to determine if support exists through the charging interface for data communication. If not, the process returns to step 82. If so, the process continues to step 90 to negotiate an appropriate data protocol and step 92 to notify the operating system of the presence of the stylus and data transfer link. For instance, once data transfer is established the operating system may initiate a system update or other logic. The process then returns to the idle state at step 82.

Although the present invention has been described in detail, it should be understood that various changes, substitutions and alterations can be made hereto without departing from the spirit and scope of the invention as defined by the appended claims.

What is claimed is:

1. A portable information handling system comprising: a portable housing having a slot formed at one side; a processor integrated in the portable housing and operable to process information; a memory integrated in the portable housing and interfaced with the processor, the memory operable to store the information; a display integrated in the portable housing and interfaced with the processor, the display presenting the information as visual images; a power supply operable to power the processor, memory and display, the power supply having a charging terminal exposed in the slot; and an active stylus having a body terminating in a capacitive tip at a first end and a power contact at a second end, the body having an area of reduced diameter around the power contact, a battery powering the capacitive tip, a charger interfaced with the battery, and a clip removably coupled to the body at the second end over the power contact, the clip fitting into the area of reduced diameter and compressing around the body, the clip integrating a charging interface on an interior side of the clip that aligns at one end of the clip with the charging terminal in the slot and at an opposing end with the power contact exposed at the outer surface of the body within the area of reduced diameter, the charging interface having a power conductive pad and a ground conductive pad aligned at the charging terminal in the slot to accept power from the charging terminal and communicate the power through the clip to the power contact.

2. The portable information handling system of claim 1 further comprising:
first and second housing portions rotationally coupled together by a hinge;
wherein the slot is formed on a side surface of the first housing portion to hold the stylus at the side surface when the clip inserts in the slot.

3. The portable information handling system of claim 2 wherein the display extends over both the first and second housing portions.

4. The portable information handling system of claim 1 further comprising:
a processor integrated in the active stylus body and interfaced with the charger; and
an embedded controller disposed in the portable housing and configured to communicate with the processor through the clip charging interface.

5. The portable information handling system of claim 1 wherein the power contact comprises a pin biased outward from the body to press against the clip.

6. The portable information handling system of claim 4 wherein the clip and body have coordinated shapes that align the clip charging interface and pin.

7. The portable information handling system of claim 4 wherein the clip inner circumference integrates a conductive ring aligned with the pin to maintain power transfer independent of a rotational orientation of the clip and body.

8. The portable information handling system of claim 1 further comprising an alarm integrated in the housing and operable to detect detachment of the body from the clip.

9. The portable information handling system of claim 1 further comprising an alarm integrated in the body and operable to detect detachment of the body from the clip.

10. A method for coupling an active stylus and information handling system, the method comprising: removeably coupling a clip to the active stylus to couple a power contact on the outer surface of the active stylus against a power interface on an inner surface of the clip, the clip compressing around the outer surface; inserting the clip into a slot formed in the information handling system housing, the clip having a power conductive pad and a ground conductive pad disposed in the slot by the inserting; applying power to the clip from within the housing through the conductive pad and ground pad; transferring power through the clip power interface to the active stylus power contact and to a battery integrated in the active stylus capacitive tip, the clip compressing to maintain contact between the clip power interface and active stylus power contact; applying a separation force at a body of the active stylus; and in response to the separation force, separating the body from the clip, the clip remaining inserted in the slot, the active stylus separated from the information handling system.

11. The method of claim 10 wherein the transferring power through the clip further comprises:
aligning a conductive wire integrated in the clip with a charging terminal disposed in the slot;
communicating power from the charging terminal through the conductive wire to a coupling element of the clip that couples at a body of the active stylus; and
communicating power from the conductive wire at the coupling element to a contact pin at the body.

12. The method of claim 11 wherein the conductive wire forms a ring around an interior side of the clip to interface with the contact pin at plural rotational orientations.

13. The method of claim 11 wherein the body and clip have cooperating forms that align the conductive wire and contact pin at coupling of the clip to the body.

14. The method of claim 11 further comprising:
monitoring with the information handling system an electric state of the clip at the housing interior; and
issuing an alarm from the information handling system if the electric state indicates separation of the active stylus from the clip.

15. The method of claim 11 further comprising:
monitoring with the active stylus an electrical state of the clip; and
issuing an alarm from the active stylus if the electric state indicates separation of the active stylus from the clip.

16. An active stylus comprising: a body having an interior and an exterior surface with an area of a reduced size at one end; a capacitive tip disposed at an opposite end of the body from the area of reduced size; a battery disposed in the interior and interfaced with the capacitive tip; a charger interfaced with the battery; a power contact interfaced with the charger and exposed at an exterior of the body in the area of reduced size; and a removably clip having a coupling element that couples to the body at the area of reduced size by compressing around the body and over the power contact and integrating a conductive element to transfer power from a power conductive pad disposed at an end of the clip opposite the coupling element and through the clip to the power contact, the clip operable to transfer power from an external power source when interfaced with the external power source, the compressing maintaining contact of the power contact against conductive element.

17. The active stylus of claim 16 further comprising an alarm disposed in the interior and interfaced with the power contact to issue an alarm notification if an electrical state detected at the power contact indicates separation of the clip from the body.

18. The active stylus of claim 16 further comprising:
a processor disposed in the body interior and operable to process information; and
memory disposed in the body interior and interface with the processor, the memory operable to store the information;
wherein the processor communicates with an external device by signals communicated through the power contact and clip.

19. The active stylus of claim 16 further comprising a conductive ring formed on an inner surface of the clip and aligned to communicate with the power contact at plural rotational orientations of the clip relative to the body.

* * * * *